United States Patent [19]
Wong

[11] 4,221,454
[45] Sep. 9, 1980

[54] BATTERY BOX, PARTICULARLY FOR USE IN TOYS

[75] Inventor: Tit-Shing Wong, Kowloon, Hong Kong

[73] Assignee: Mego Corp., New York, N.Y.

[21] Appl. No.: 951,401

[22] Filed: Oct. 16, 1978

[51] Int. Cl.³ ........................................... H01R 13/02
[52] U.S. Cl. ................................. 339/176 R; 46/228; 339/147 R
[58] Field of Search ................. 339/91 F, 119 R, 147, 339/150 B, 224, 228, 176 R, 255 R; 46/45, 328–332

[56] References Cited
U.S. PATENT DOCUMENTS

| 1,459,336 | 6/1923 | Link | 339/150 B |
| 2,679,545 | 5/1954 | Kistler | 339/255 R |
| 2,716,738 | 8/1955 | Pistey | 339/255 R |
| 2,942,379 | 6/1960 | Oman et al. | 46/230 |
| 3,949,517 | 4/1976 | Reiner et al. | 46/45 |

Primary Examiner—Joseph H. McGlynn
Attorney, Agent, or Firm—Bertram Frank

[57] ABSTRACT

A battery box, particularly for use in toys, is capable of establishing electrical contact with battery terminals. The battery box includes a housing which bounds a compartment for accommodating at least one battery, but preferably a plurality of batteries therein. A pair of contact members is provided for the battery or each of the batteries, each of the contact members having a contact portion located in the compartment and adapted to contact one terminal of the battery. A mounting portion of one of the contact members of the pair is slidably received in an opening of an end wall of the housing and a leaf spring biases the contact member towards its extended position in which a contact portion of the contact member contacts and presses against one terminal of the respective battery. The leaf spring is located adjacent the surface of the end wall which faces away from the compartment. The slidably mounted contact member is plate-shaped and the opening of the end wall has a corresponding configuration. The contact portion diverges from its contact face toward the mounting portion.

3 Claims, 5 Drawing Figures

BATTERY BOX, PARTICULARLY FOR USE IN TOYS

BACKGROUND OF THE INVENTION

The present invention relates to a battery box capable of establishing electrical contact with battery terminals in general, and particularly to a battery box which is especially suited for use in toys.

When batteries are being used for supplying electrical power to various devices such as toys or the like, it is very desirable to make the connection and disconnection of the battery or batteries powering the device as simple as possible, especially in view of the fact that the users of these devices, who may be children, ought not to be expected to possess a high degree of mechanical skill. On the other hand, once the battery or the batteries are in place, they should be securely retained in their positions even when the device or some parts thereof are subjected to vibrations or even shocks or jolts.

Attempts have already been made to satisfy the above-discussed requirements. In many instances, the batteries are accommodated in a compartment provided in the device itself or in a separate housing which is electrically and/or mechanically connected or connectable to the device. Then, it has been proposed to make at least one of the pair of contacts which extend into the compartment to contact the terminals of the respective battery resiliently yieldable so that, once the battery is inserted between the pair of contacts, the terminals of the battery are pressed against both of the contacts of the respective pair. However, experience with this type of an arrangement has shown that it still leaves much to be desired, especially with respect to the ease of insertion and removal and the reliability of retention of the batteries.

SUMMARY OF THE INVENTION

Accordingly, it is a general object of the present invention to avoid the disadvantages of the prior art.

More particularly, it is an object of the present invention to provide a battery box for establishing electrical contact with battery terminals, which is not possessed of the above-enumerated disadvantages of the prior-art battery boxes of this type.

Still another object of the present invention is to so design the contacts which extend into a compartment of a housing of the battery box that the accessible portions thereof will not present any danger of injury to the user of the battery box.

A concomitant object of the present invention is to construct a battery box which is simple in construction, inexpensive to manufacture, easy to operate and reliable in use nevertheless.

In pursuance of these objects and others which will become apparent hereafter, one feature of the present invention resides in a battery box, particularly for use in toys, for establishing electrical contact with battery terminals, which includes a housing bounding a compartment for accommodating at least one battery and including an end wall having at least one opening therein; a pair of contact members each having a contact portion located in the compartment and adapted to contact one terminal of the battery, and a mounting portion supported on the housing, at least a first one of the contact members being partially received in the opening of the end wall for displacement between an extended and a retracted position; and means for biasing the first contact member toward the extended position thereof. As a result of the fact that the first contact member is partially received in the opening of the end wall, it is possible to locate the biasing means outside the compartment. As a result of this, not only will the danger of any damage to the biasing means be considerably reduced if not eliminated, but also the user of the battery box will be protected from an injury which could otherwise result if he or she were able to inadvertently touch the biasing means which usually has sharp edges or the like.

An especially advantageous embodiment of the present invention is obtained when the mounting portion of the first contact member is received in the above-mentioned opening for sliding between the extended and retracted positions of the first contact member. Under these circumstances, the surfaces which bound the opening in the end wall will simultaneously serve for guiding the first contact member during its sliding displacement so that no further provisions need be made for the support of the first contact member on the housing.

It is further advantageous in this connection when the opening passes through the end wall, and when the first contact member further has a limiting portion adjoining the mounting portion opposite the contact portion and having at least one dimension exceeding the corresponding dimension of the opening to limit the extent of sliding displacement to the extended position. It is assured in this manner that, even in the absence of the battery or batteries from the compartment, the contact member will not be able to pass through the opening into the compartment.

In an advantageous embodiment of the present invention, the biasing means includes a spring which is connected to the housing and acts on the limiting portion. Then, it is especially advantageous and currently preferred to configurate the spring as a leaf spring and to so mount it on the housing as to extend transversely of the trajectory of sliding displacement of the first contact member. Then, it is further advantageous to form the limiting portion of the first contact member with a recess, and to have the leaf spring to be partially received in the recess. When this construction is resorted to, the mounting of the first contact member is especially simple inasmuch as it is sufficient to introduce the first contact member, in its proper position, into the opening of the end wall to the extent permitted by the limiting portion of the first contact member, and to then insert a portion of the leaf spring in the recess of the limiting portion, whereupon the leaf spring will prevent the first contact member from being expelled out of the opening of the end wall of the housing under ordinary conditions encountered during the use of the battery box.

While the above-discussed concepts of the present invention can be used, to advantage, in an environment where only one battery is needed for powering the device or toy, it is further advantageous in accordance with another aspect of the present invention to employ the same concepts in a battery box capable of accommodating and electrically connecting more than one battery. Under these circumstances, the compartment of the housing of the battery box has such dimensions as to be able to accommodate at least one additional battery next to the above-mentioned battery. Then, each of the batteries has a pair of the above-discussed contact members associated therewith, each of the pairs being so located on the housing as to register with the terminals of a respective one of the batteries. The biasing means is then so constructed as to act on all of the first contact members of the various pairs, be it by the provision of separate biasing arrangements for each of the first contact members, or by utilizing the same biasing arrangement for at least two different ones of the first contact members.

An advantageous embodiment of the last-mentioned concept is obtained when the leaf spring has a central portion which is mounted on the housing, and two end portions each of which is received in the recess of one of the first contact members. It is also very advantageous when the leaf spring is electrically conductive since it can be simultaneously used for electrically connecting the first contact members of the different pairs with one another. This eliminates the previously existing need for providing separate electrically conductive connecting means, such as wires or the like.

A particularly advantageous and simple construction of the present invention is obtained when the leaf spring is located next to a surface of the end wall which faces away from the compartment. When this arrangement of the leaf spring is resorted to, it is possible to provide at least one supporting rib on the housing, such a supporting rib extending beyond the above-mentioned surface and contacting the leaf spring at least in the extended position of the first contact member. In this manner it is assured that the biasing action of the leaf spring is discontinued or diminished once the first contact member reaches its extended position.

According to a further aspect of the present invention, the end wall is further provided with two confining ribs which extend from the end wall into the compartment and partially bound the opening. These confining ribs confine the first contact member between themselves during the sliding displacement thereof, thus providing an assurance that the first contact member will not become jammed in the opening under the normal circumstances. However, these confining ribs, due to their extension into the compartment, also determine the extent to which the first contact member can be displaced into its retracted position while the respective battery terminal or a finger of the user acts on the first contact member. Thus, the confining ribs also avoid the possibility that the leaf spring could be deformed beyond its elastic limit during an excessive retraction of the first contact member.

Advantageously, the second contact member of the pair is so stationarily mounted on an additional end wall of the housing which is parallel to and spaced from the above-mentioned end wall as to be in substantial registry with the first contact. However, the second contact member may also have at least some resiliency, or may even be resiliently mounted in a manner similar or even identical to that in which the first contact member is mounted.

The battery box is particularly practical in terms of reliability of contact and safety of operation when the first contact member has an end face which has a dimension substantially corresponding to the diameter of the smaller one of the terminals of the battery. In this manner, the largest possible contact area of the first contact member with the smaller terminal is obtained for each given transverse dimension, but simultaneously, the first contact member will not extend beyond the smaller terminal of the battery and thus will not present any sharp edge which could result in injury to the user while manipulating the battery. It is further advantageous when the contact portion of the first contact member diverges from the end face toward the mounting portion, since the necessary structural strength is obtained thereby. Furthermore, it is advantageous when the mounting portion of the first contact member has at least one dimension at the region of merger with the contact portion which exceeds the corresponding dimension of the contact portion. As a result of this configuration the mounting portion will have the rigidity which is required for reliably transmitting the biasing forces from the leaf spring to the contact face, will be resistent to bending and other deformation, and the contact portion will also have such dimensions which are needed for a reliable performance of the function of the contact portion. Thus, the dimensions of the contact portion on the one hand, and of the mounting portion, on the other hand, are selected independently of one another in dependence on the function and stresses to which these individual portions are subjected.

A particularly advantageous construction of the above-discussed concepts of the present invention is obtained when the opening of the end wall and the mounting portion of the first contact member have compatible noncircular configurations. What is achieved by utilizing this expedient is that the first contact member will be prevented from rotating within the opening in the end wall so that the leaf spring will not be subjected to any forces or moments acting in a plane along which the portion of the leaf spring which acts on the first contact member is located. In this context it is particularly advantageous when the first contact member is plate-shaped having substantially the same thickness throughout. A first contact member of this configuration not only satisfies the above-mentioned condition, but is also very easy to manufacture from sheet material by resorting, for instance, to stamping procedures.

Accordingly, the invention consists in the features of construction, combination of elements, and arrangement of parts which will be exemplified in the article of manufacture hereinafter described and of which the scope of application will be indicated in the appended claims.

BRIEF DESCRIPTION OF THE DRAWINGS

In the accompanying drawing in which one of the various possible embodiments of the invention is shown.

DETAILED DISCUSSION OF THE PREFERRED EMBODIMENT

Figure 1:
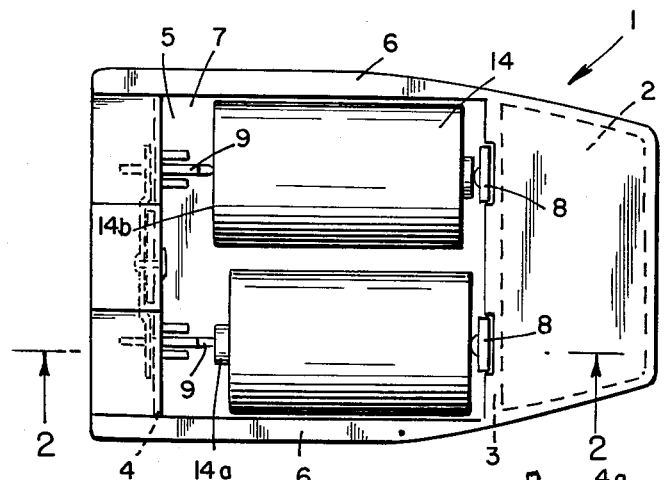
FIG. 1 is a bottom plan view of a housing of the battery box of the present invention with two batteries accommodated therein.

Referring now to the drawing in detail, and first to FIG. 1 thereof, it may be seen that the reference numeral 1 has been used to designate a battery box of the present invention in its entirety. The battery box includes a housing 2 which has two end walls 3 and 4, a bottom wall 5, and two lateral walls 6. As more particularly seen in FIG. 2, the end walls 3 and 4, the bottom wall 5 and the lateral walls 6 together bound a compartment 7 for accommodating, in the illustrated exemplary embodiment, two standard batteries 14. It will be appreciated that a lid may, and usually will, be provided for closing the open end of the compartment 7; however, such a lid has not been illustrated in the drawings in order not to unduly encumber the same with details which constitute no part of the present invention. Similarly, the housing 2 itself is illustrated and described only to the extent needed for understanding the present invention. While FIG. 1 illustrates the housing 2 in a view from below as considered in the position of use of the particular housing 2, it is to be understood that the compartment 7 could be so situated as to open onto the top, side, or end surface of the device or housing in which the batteries 14 are to be accommodated.

Figure 2:
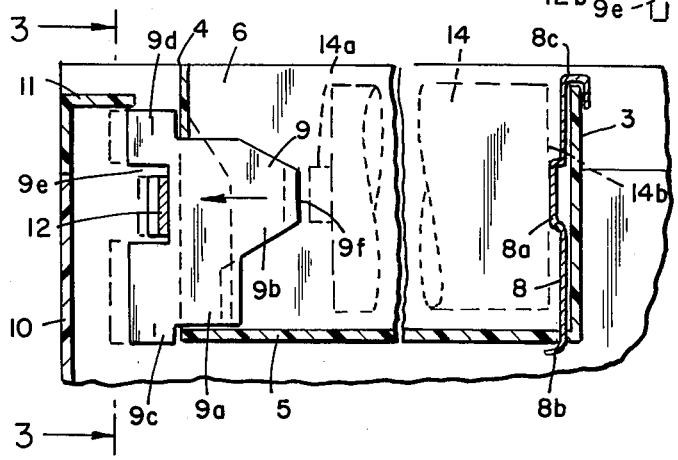
FIG. 2 is an enlarged fragmentary sectional view taken on line II—II of FIG. 1.

Two stationary contact members 8 are mounted on the housing 2 and more particularly on the end wall 3. As may be ascertained from FIG. 2, the stationary contact member 8 has a protrusion 8a which constitutes a contact portion of the contact member 8 and which is in an electrical contact with a terminal 14b of one of the batteries 14. However, as a comparison with FIG. 1 will reveal, the two batteries 14 are accommodated in the compartment 7 in reversed positions so that the contact portion 8a of the other stationary contact member 8 mechanically and electrically contacts a smaller terminal 14a of the other battery 14. As also illustrated in FIG. 2, the stationary contact member 8 has one end portion 8b which passes through and engages behind the bottom wall 5 of the compartment 6. The stationary contact member 8 also has another end portion 8c which is bent around the end wall 3. In this manner, the contact member 8 is stationarily mounted on the housing 2.

Figure 3:
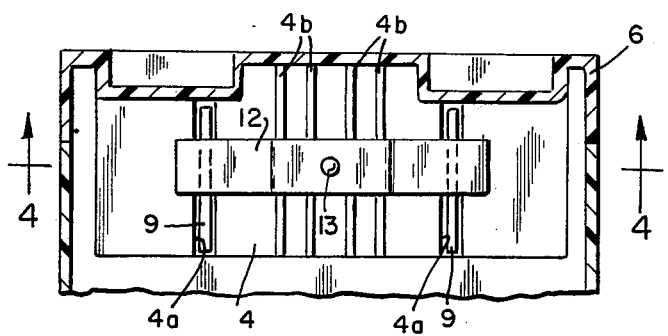
FIG. 3 is a partially sectioned end view of the battery box of FIG. 1, taken on line III—III of FIG. 2.
Figure 5:
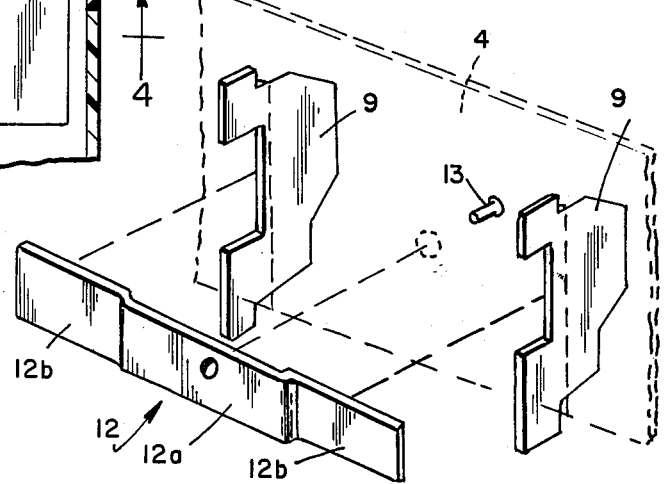
FIG. 5 is an exploded view showing some elements of the battery box of FIG. 1.

As seen in FIG. 3, the end wall 4 has two openings 4a therein. A contact member 9, illustrated in more detail in FIG. 2, is slidably received in the opening 4a of the end wall 4. The contact member 9 includes a mounting portion 9a, a contact portion 9b and a bifurcated limiting portion including two arms 9c and 9d, respectively. The limiting portion is formed with a recess 9e which is located between the two arms 9c and 9d of the limiting portion of the contact member 9.

The contact portion 9b has an end face 9f and diverges from the contact face 9f toward the mounting portion 9a. As seen in FIG. 2, the contact face 9f has a dimension substantially equal to that of the smaller terminal 14a so that, in the mounted position of the battery 14, the end face 9f of the contact member 9 will not extend beyond the terminal 9f, provided that the end face 9f cooperates with this terminal 14a. On the other hand, should the contact face 9f cooperate with the larger terminal 14b of the battery 14 as it is the case with the battery 14 assuming the upper position in FIG. 1, the same advantage will be obtained in view of the fact that the terminal 14b of the battery 14 has a larger diameter than the terminal 14a of the same battery 14.

The housing 2 further includes protective walls 10 and 11 which together bound a confining space. The arms 9c and 9d of the contact member 9 are accommodated in this confining space, while the mounting portion 9a extends through the opening 4a and the contact portion 9b of the contact member 9 projects into the compartment 7 in its extended position illustrated in full lines in FIG. 2. The contact member 9 is movable, in the direction of the arrow, from its extended position into its retracted position illustrated in broken lines in FIG. 2. In its extended position, the end face 9f of the contact member 9 is spaced from the protuberance 8a of the contact member 8 by a distance smaller than the distance between the terminals 14a and 14b of the battery 14. On the other hand, when the contact member 9 is in its retracted position, these two distances are equal.

A spring 12 illustrated as a leaf spring, is connected to the end wall 4 by a rivet 13 or any other suitable connecting element and extends transversely of the trajectory of movement of the respective contact member 9, as particularly well seen in FIG. 3. The leaf spring 12 has a central portion 12a which is flanked by two end portions 12b each of which is received in one of the recesses 9e of the respective contact member 9. The spring 12, and particularly the end portions 12b thereof urge the respective contact members 9 toward their extended positions.

It will be appreciated from the above explanation that, so long as the compartment 7 is empty, the contact members 9 will assume their extended positions, being biased toward them by the end portions 12b of the spring 12. On the other hand, when the respective battery 14 is introduced into the compartment 7, its terminal 14a or 14b which cooperates with the respective contact member 9 first, the respective terminal 14a or 14b will push the respective contact member 9, against the force exerted on the latter by the spring 12, into its retracted position, thus obtaining a sufficient space in the compartment 7 for the other of the terminals 14b and 14a to clear the protuberance 8a of the contact member 8, so that the battery 14 can be properly positioned in the compartment 7. Thereupon, the respective battery 14 can be released and the force of the spring 12 will displace the contact member 9 and, consequently, also the battery 14, opposite to the direction of the arrow so that the other terminal 14b or 14a will establish a reliable, electrically conductive, mechanical contact with the protuberance 8a of the respective contact member 8.

Figure 4:
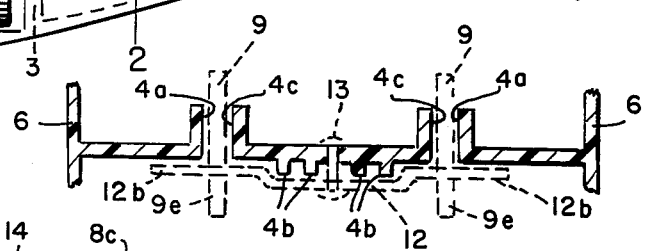
FIG. 4 is a partial sectional view taken on line IV—IV of FIG. 3.

Referring now particularly to FIGS. 3 and 4, it may be seen therein that the end wall 4 has a plurality of, in the illustrated example four, support ribs 4b which extend beyond the surface of the end wall 4 which faces away from the compartment 7. These ribs 4b contact the central portion 12a of the spring 12 when the contact member 9 is in its extended position. Because of this, the contact members 9 will be subjected to only a minimum amount of force by the respective end portions 12b of the spring 12 when the contact member 9 assumes its extended position.

The end wall 4 is also provided with a pair of ribs 4c at its surface which faces the compartment 7, as particularly illustrated in FIG. 4. These confining ribs 4c, define an extension part of the opening 4a beyond the end wall 4 and into the compartment 7. Since the surfaces which bound the opening 4a simultaneously serve for guiding the respective contact member 9 between its extended and retracted positions, the extension of these surfaces onto the confining ribs 4c provides for a more reliable guidance of the respective contact member 9 and avoids the possibility that the same could become jammed in the opening 4a or that it could deviate from the plane along which it is intended to move between its positions.

However, an additional advantage of providing the confining ribs 4c is that they limit the extent to which the contact member 9 can be moved in the direction of the arrow. Of course, it would still be possible to willfully displace the contact member 9 to such an extent that the end face 9f would be located a certain distance within the opening 4a; however, under normal circumstances of use, the confining ribs 4c will prevent the displacement of the contact member 9 beyond the position in which the end face 9f is flush with the confining ribs 4c, as a result of which it is avoided that the spring 12 could be deformed beyond its elastic limit and thus obtain an undesirable permanent deformation.

According to a currently preferred concept of the present invention, the leaf spring 12 is made of an electrically conductive material so that, in addition to its biasing function, it also serves for establishing an electrical contact between the two terminals 9, thus interconnecting the batteries 14 in series in the illustrated positions of the batteries. The same concept, however, could also be used if the batteries were to be electrically connected in parallel.

Of course, the contact members 8 and 9 will be incorporated in an electric circuit of the device in connection with which the battery box is being employed. However, this circuit forms no part of the invention; in fact, the battery box of the present invention could be used to supply electric current to any conventional electric circuit. Therefore, the electrical circuit has not been illustrated in the drawings.

It will be appreciated that, while both of the contact members 8 have been illustrated as being located at the end wall 3 and both of the contact members 9 at the end wall 4, it would also possible and is contemplated by the present invention to locate one of the terminals 8 and 9 at each of the end walls 3 and 4. Similarly, while the battery box has been illustrated as having a compartment 7 for two batteries, the same type of arrangement of the contact members 8 and 9 could be employed in connection with a different battery box capable of accommodating either a single battery, or more than two batteries.

A particular advantage of the construction of the present invention is that all of the components which could cause injury to a user of the battery box 1 are concealed in the space bounded by the protective walls 10 and 11 and thus out of reach. Another advantage is the particularly simple, but nevertheless reliable, construction of the contact members 9 and of the spring 12.

As various possible embodiments might be made of the above-discussed invention, and as various changes might be made in the embodiment set forth above, it is to be understood that all matter herein described or shown in the accompanying drawings is to be interpreted as illustrative and not in a limiting sense. Thus, it will be understood by those skilled in the art that, although a preferred embodiment has been shown and described in the foregoing description and in the accompanying drawings, the invention is not limited thereto or thereby. Rather, the scope of protection sought will appear exclusively from the following claims.

I claim:

1. A battery box, particularly for use in toys, for establishing electrical contact with battery terminals, comprising a housing bounding a compartment for accommodating at least one battery and including an end wall having at least one opening therein; the opening being elongated in the direction of battery movement when inserting or removing the same; a pair of electrically conductive contact members each having a contact portion located in the compartment and adapted to contact one terminal of the battery, a mounting portion supported on the housing, and a limiting portion having a recess, at least a first one of the contact members being a plate member partially received in the opening of the wall for displacement of the contact portion thereof between an extended and a retracted position; the plate member being beveled adjacent the contact portion thereof; and flat spring means having a central portion mounted on the end wall and two end portions each received in the recess of one of the contact members, the spring being mounted on and outwardly of the end wall extending transversely of the plate member and engaging the end thereof opposed to the contact portion for biasing the first contact member toward the extended position thereof.

2. A battery box as defined in claim 1, wherein said leaf spring is electrically conductive to electrically connect said first contact members with one another.

3. A battery box as defined in claim 1, wherein said end wall has a surface facing away from said compartment; wherein said flat spring means is located next to said surface; and wherein said end wall further includes at least one supporting rib extending beyond said surface and contacting said leaf spring at least in said extended position of said contact member.

* * * * *